(12) United States Patent
Iniewski et al.

(10) Patent No.: US 10,393,891 B2
(45) Date of Patent: Aug. 27, 2019

(54) SUB-PIXEL SEGMENTATION FOR SEMICONDUCTOR RADIATION DETECTORS AND METHODS OF FABRICATING THEREOF

(71) Applicant: REDLEN TECHNOLOGIES, INC., Saanichton (CA)

(72) Inventors: Kris Iniewski, Coquitlam (CA); Glenn Bindley, Vancouver (CA)

(73) Assignee: REDLEN TECHNOLOGIES, INC., Saanichton (CA)

( * ) Notice: Subject to any disclaimer, the term of this patent is extended or adjusted under 35 U.S.C. 154(b) by 27 days.

(21) Appl. No.: 15/144,861

(22) Filed: May 3, 2016

(65) Prior Publication Data

US 2017/0322319 A1    Nov. 9, 2017

(51) Int. Cl.
*G01T 1/24* (2006.01)
*G01T 1/17* (2006.01)

(52) U.S. Cl.
CPC ............... *G01T 1/24* (2013.01); *G01T 1/171* (2013.01)

(58) Field of Classification Search
CPC .................................... G01T 1/17; G01T 1/24
USPC ..................................................... 250/370.09
See application file for complete search history.

(56) References Cited

U.S. PATENT DOCUMENTS

| | | | | |
|---|---|---|---|---|
| 5,608,776 A * | 3/1997 | Hsieh | ............... | G21K 1/04 378/145 |
| 5,847,398 A * | 12/1998 | Shahar | ............... | G01T 1/1648 250/370.09 |
| 7,103,204 B1 * | 9/2006 | Celler | ............... | G06T 11/006 382/128 |
| 7,187,750 B1 * | 3/2007 | Hsieh | ............... | A61B 6/032 378/19 |
| 8,476,594 B2 * | 7/2013 | Frach | ............... | G01T 1/2018 250/363.03 |
| 8,564,084 B2 | 10/2013 | Vogtmeier et al. | | |
| 2002/0037068 A1 | 3/2002 | Oikawa | | |
| 2005/0167606 A1 | 8/2005 | Harrison et al. | | |
| 2006/0011852 A1 * | 1/2006 | El-Hanany | ............... | G01T 1/243 250/370.09 |

(Continued)

OTHER PUBLICATIONS

Kalender, W.A., "Trends in X-Ray CT Imaging and Respective Demands on Detectors," Institute of Medical Physics, iworid 2008, Helsinki, 33 pages, (2008).

(Continued)

*Primary Examiner* — David P Porta
*Assistant Examiner* — Gisselle Gutierrez
(74) *Attorney, Agent, or Firm* — The Marbury Law Group, PLLC

(57) ABSTRACT

Various embodiments described herein may include a detector array for a CT imaging system. The detector array includes a pixel array in which each pair of adjacent pixels in the pixel array may be separated by a collimator (e.g., located between each row and column of the pixel array) that absorbs photons and each pixel in the pixel array includes a sub-pixel array. The collimator absorbs photons that strike at a boundary between adjacent pixels. Each sub-pixel may have an anode that is connected to an ASIC channel. When a sub-pixel in a pixel detects a photon, signals of a plurality of sub-pixels in the pixel are automatically summed, including the sub-pixel that detected the photon.

12 Claims, 8 Drawing Sheets

(56) References Cited

U.S. PATENT DOCUMENTS

| | | | |
|---|---|---|---|
| 2006/0118730 A1* | 6/2006 | Hefetz | G01T 1/2928 250/370.09 |
| 2007/0007457 A1* | 1/2007 | Blevis | G01T 1/2018 250/370.09 |
| 2007/0120062 A1* | 5/2007 | Li | G01T 1/2928 250/370.09 |
| 2007/0121781 A1 | 5/2007 | Meirav et al. | |
| 2008/0165921 A1 | 7/2008 | Tkaczyk et al. | |
| 2008/0230709 A1* | 9/2008 | Tkaczyk | G01T 1/242 250/370.09 |
| 2008/0296479 A1* | 12/2008 | Anderson | H01J 5/18 250/226 |
| 2010/0098210 A1 | 4/2010 | Hackenschmied et al. | |
| 2010/0193696 A1* | 8/2010 | Blevis | G01T 1/249 250/370.08 |
| 2011/0155918 A1* | 6/2011 | Bouhnik | G01T 1/249 250/370.14 |
| 2011/0204245 A1* | 8/2011 | Robert | G01T 1/24 250/370.08 |
| 2011/0211668 A1* | 9/2011 | Steadman Booker | G01T 1/249 378/19 |
| 2011/0260072 A1* | 10/2011 | Guerin | G01T 1/2928 250/370.09 |
| 2011/0293068 A1* | 12/2011 | Langhoff | H04N 5/32 378/98.8 |
| 2012/0069954 A1* | 3/2012 | Iso | A61B 6/03 378/7 |
| 2014/0341333 A1* | 11/2014 | Wang | A61B 6/032 378/19 |
| 2015/0131776 A1* | 5/2015 | Cho | G01N 23/02 378/19 |
| 2015/0185333 A1* | 7/2015 | Cho | G01T 1/17 250/394 |
| 2015/0234059 A1 | 8/2015 | Roessl et al. | |
| 2015/0243022 A1 | 8/2015 | Petschke et al. | |
| 2016/0093665 A1* | 3/2016 | Schubert | H01L 27/15 257/13 |
| 2016/0240584 A1 | 8/2016 | El-Hanany et al. | |
| 2016/0282505 A1* | 9/2016 | Lee | G01V 5/125 |
| 2016/0296184 A1* | 10/2016 | Rodrigues | A61B 6/4241 |
| 2017/0016998 A1* | 1/2017 | Shahar | G01T 1/241 |

OTHER PUBLICATIONS

Hu, H. et al., "*Four Multidetector-Row Helical CT: Image Quality and Volume Coverage Speed*," Radiology, vol. 215, No. 1, pp. 55-62, (2000).

Chmeissani, M. et al, "*First Experimental Tests with a CdTe Photon Counting Pixel Detector Hybridized with a Medipix2 Readout Chip*," IEEE Transactions on Nuclear Science, vol. 51, No. 5, pp. 2379-2385, (2004).

Shikhaliev, P.M. et al, "*Tilted Angle CZT Detector for Photon Counting/Energy Weighting X-ray and CT Imaging*," Phys Med Biol., vol. 51, No. 17, pp. 4267-4287, (2006).

Iniewski, K. et al., "*CZT Growth, Characterization, Fabrication, and Electronics for Operation at >100 Mcps/mm$^2$*," Workshop on Medical Applications of Spectroscopic X-Ray Detectors, CERN, 1 page, (2015).

Murphy, D.T. et al., "*Technical Advancements in Dual Energy*," Published in P.M. Carrascosa et al. (eds.), Dual-Energy CT in Cardiovascular Imaging, Springer International Publishing, Switzerland, pp. 151-152, (2015).

Taguchi, K. et al, "*An Analytical Model of the Effects of Pulse Pileup on the Energy Spectrum Recorded by Energy Resolved Photon Counting X-ray Detectors*," Medical Physics, vol. 37, No. 8, pp. 3957-3969, (2010).

Koenig, T. et al., "The New Medipix3 Rx with CdTe Sensors: How Charge Summing Copes with Characteristic X-Rays and High Photon Fluxes," Karlsruhe Institute of Technology, pp. 1-19, (2013).

Kalemci, E. et al., "Investigation of charge sharing among electrode strips for a CdZnTe detector," Center for Astrophysics and Space Sciences, University of California, San Diego, California, pp. 1-16, (2013).

Hamel, L.A. et al., "Optimization of Single-Sided Charge-Sharing Strip Detectors," Hamel IEEE, pp. 1-3, (2006).

Oonuki, K. et al., "Development of Uniform CdTe Pixel Detectors Based on Caltech ASIC," aInstitute of Space and Astronautical Science (ISAS/JAXA), Sagamihara, Kanagawa 229-8510, Japan; Department of Physics, University of Tokyo, Bunkyo, Tokyo 113-0033, Japan; and Department of Physics, California Institute of Technology, Pasadena, CA 91125, USA, 11 pages, (2004).

Spieler, H., "Analog and Digital Electronics for Detectors," Physics Division, Lawrence Berkeley National Laboratory, Berkeley, California, pp. 1-43, (2003).

Murphy, D. T. et al., "Technical Advancements in Dual Energy," Department of Radiology, St. Paul's Hospital, Springer International Publishing Switzerland, pp. 151-172, (2015).

U.S. Appl. No. 15/095,786, filed Apr. 11, 2016, Iniewski et al.

\* cited by examiner

400

| Sub-pixel (1, 1) | | | | | Sub-pixel (1, M) |
|---|---|---|---|---|---|
| | | | | | |
| | | | | | |
| | | | | | |
| | | | | | |
| | | | | | |
| Sub-pixel (N, 1) | | | | | Sub-pixel (N, M) |

FIG. 4

SUB-PIXEL SEGMENTATION FOR SEMICONDUCTOR RADIATION DETECTORS AND METHODS OF FABRICATING THEREOF

FIELD

The present application is directed to the field of radiation detectors, and specifically to segmenting pixels of a radiation detector into sub-pixel arrays and methods for fabricating and operating thereof.

BACKGROUND

In computed tomography (CT) imaging systems, an X-ray source emits a fan-shaped beam toward an object, such as piece of baggage at an airport scanner or patient in a medical diagnostic clinic, or any other biological or non-biological object that is being imaged. The X-ray beam is attenuated by the object and subsequently detected by a detector element, such as a Cadmium Zinc Telluride (CdZnTe, or CZT) detector. Other direct conversion detectors such as Cadmium Telluride (CdTe), Gallium Arsenide (GaAs), or Silicon (Si), or any indirect director based on scintillator material may also be used in CT imaging systems. Image slices collected by scanning the object may, when joined together, produce 3-dimensional cross-section images of the object.

In typical CT imaging systems, a detector array that includes a number of detector elements may each produce a dedicated electrical signal that indicates the level of attenuation received by each detector element. The electrical signals may be transmitted to a data processing card for analysis. Finally, using image reconstruction techniques an image is produced. The intensity of the attenuated beam received by each detector element is dependent upon the attenuation of the X-ray beam by the object. For example, when scanning a human body, bone turns up white, air turns up black, and tissues and mucous turn up in shades of gray.

SUMMARY

Various systems and methods described herein provide a way to design a detector array with small pixel sizes that reduce the occurrence of negative effects such as charge sharing and charge pile-up. Various apparatuses described herein may include a detector array for a CT imaging system. The detector array includes a pixel array in which each pair of adjacent pixels in the pixel array may be separated by a collimator (e.g., located between each row and column of the pixel array) that absorbs photons and each pixel in the pixel array includes a sub-pixel array. The collimator absorbs photons that strike at a boundary between adjacent pixels. Each sub-pixel may have an anode that is connected to an Application Specific Integrated Circuit (ASIC) channel. When a sub-pixel in a pixel detects a photon, signals of a plurality of sub-pixels in the pixel are automatically summed, including the pixel that detected the photon.

Various methods described herein may include a method of operating a CT imaging system. The method may include detecting a photon incident on a sub-pixel in a sub-pixel array of a pixel, reading out a signal from a plurality of sub-pixels in the sub-pixel array including the sub-pixel that detected the photon, automatically summing the signal from the plurality of sub-pixels in the sub-pixel array, and outputting the summed signal from the first pixel. Then pixel may be part of a pixel array in a detector array, and each pair of adjacent pixels in the pixel array may be separated by a collimator that absorbs photons. Each sub-pixel in the sub-pixel array may have a separate anode and may not be separated by collimators. The photon may be detected when a charge of the photon exceeds a threshold.

Various methods described herein may include a method of fabricating a radiation detector array. The method may include determining a size of a sub-pixel array for each pixel of a pixel array in a radiation detector, in which the size is based on attributes of the radiation detector, fabricating the pixel array and the sub-pixel array of each pixel in the sub-pixel array based on the determined size, placing a collimator between each row and each column of the pixel array, and connecting a pixel detector circuit to each pixel in the array of pixels. The attributes of the radiation detector array may include at least one of a loading capacitance of one or more ASIC channels in the pixel detector circuit, an energy resolution of the radiation detector array, a dark current of each sub-pixel, a noise level of each sub-pixel, a charge cloud size of each sub-pixel, and a maximum count rate of the one or more ASIC channels.

BRIEF DESCRIPTION OF THE DRAWINGS

FIG. 4 is a component block diagram of a pixel in a radiation detector array according to various embodiments.

DETAILED DESCRIPTION

In CT imaging systems, the scanned object is exposed to the X-ray beam and the attenuated photons from the beam are detected by a detector array. When an object is in the CT imaging systems, the X-ray beam may be heavily attenuated and so the amount of photons that are detected may be orders of magnitude less than the amount of photons emitted by the X-ray source. For image reconstruction reasons, the detector array is also exposed to the direct X-ray beam without any object inside the CT imaging system. In such cases, the photon count rates in the CT imaging system may reach values of 100 million counts per second per millimeter squared (Mcps/mm$^2$) or more. The detector array may be capable of detecting such high photon counts.

However, in high photon count situations there are several problems that may arise. For example, successive photons may strike a detector element, or pixel, before the energy has fully dissipated from the detector element. This is known as a pile-up effect and may result in distortions in detecting the number of photons and the energy of each photon. Another problem may arise when a photon strikes a boundary between two or more pixels. Thus multiple pixels may register a photon count for the same photon, and the detected energy of the photon may not accurately reflect the actual energy of the photon.

The various apparatuses, systems and methods disclosed herein may provide a way to mitigate charge sharing and pile-up effects in high count rate photon detectors. A detector array may be designed to include a pixel array in which each pair of adjacent pixels in the pixel array may be separated by a collimator (e.g., located between each row and column of the pixel array) that absorbs photons. Each pixel in the pixel array may include a sub-pixel array. Each sub-pixel may have an anode that is connected to an ASIC channel. When a sub-pixel in a pixel detects a photon, signals of a plurality of sub-pixels in the pixel are automatically summed. Thus while the small sub-pixel size decreases pile-up effects but increases charge sharing effects, the automatic summation compensates for the increase in charge sharing effects. The collimators also prevent or reduce charge sharing events.

Figure 1:
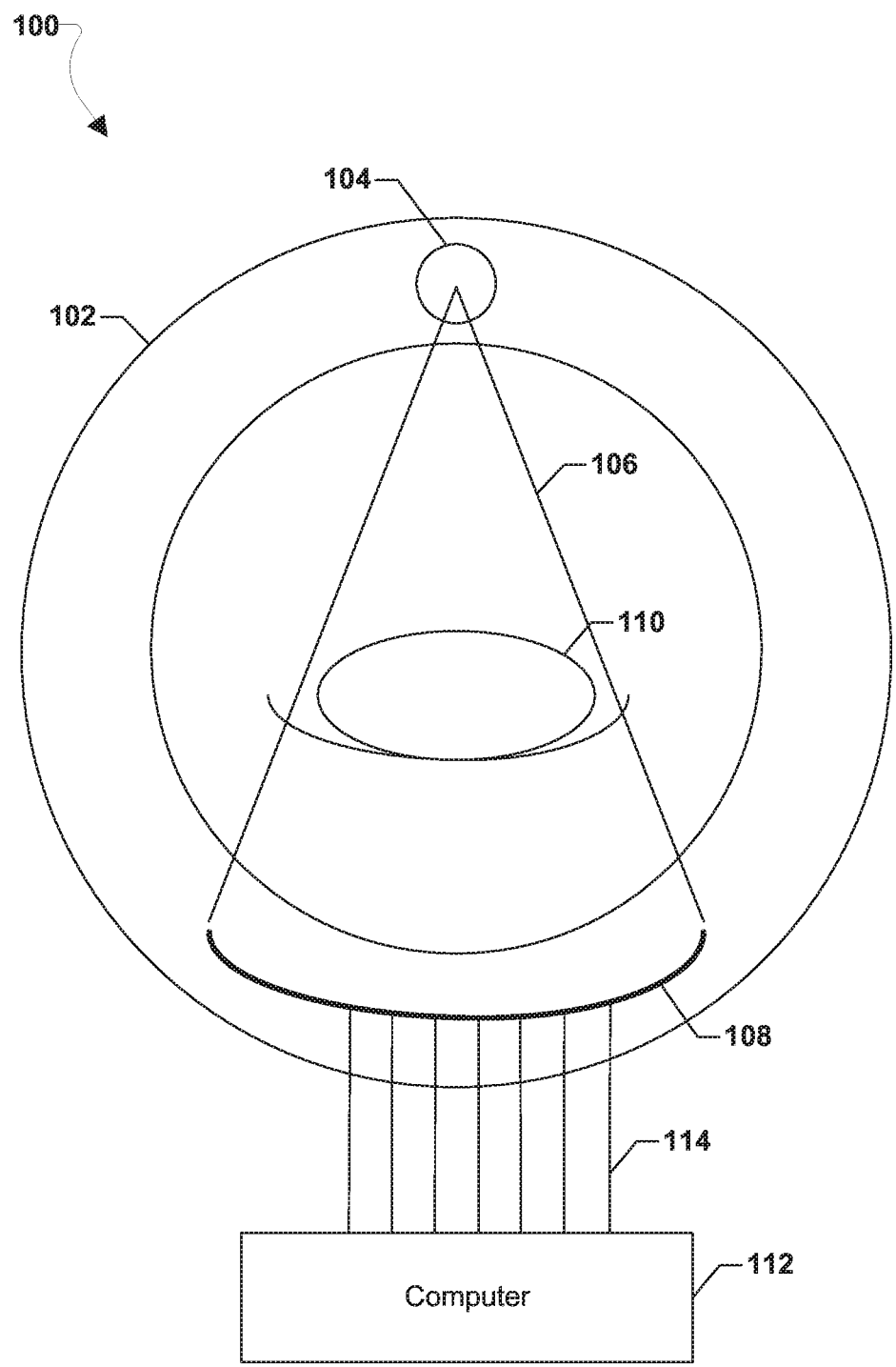
FIG. 1 is a functional block diagram of a CT imaging system according to various embodiments.

FIG. 1 is a functional block diagram of a CT imaging system 100 according to various embodiments. The CT imaging system 100 may include a gantry 102, which may include a moving part, such as a circular, rotating frame with an X-ray source 104 mounted on one side and a curved detector array 108 mounted on the other side. The gantry 102 may also include a stationary (i.e., non-moving) part, such as a support, legs, mounting frame, etc., which rests on the floor and supports the moving part. The X-ray source 104 may emit a fan-shaped X-ray beam 106 as the gantry 102 and the X-ray source 104 rotates around an object 110 inside the CT imaging system 100. The object 110 may be any biological (e.g., human patient) or non-biological sample to be scanned. After the X-ray beam 106 is attenuated by the object 110, the X-ray beam 106 is received by the detector array 108. The curved shape of the detector array 108 allows the CT imaging system 100 to create a 360° continuous circular ring of the image of the object 110 by rotating the gantry 102 around the object 110.

For each complete rotation of the gantry 102, one cross-sectional slice of the object 110 is acquired. As the gantry 102 continues to rotate, the detector array 108 takes numerous snapshots called "view". Typically, about 1,000 profiles are taken in one rotation of the gantry 102. The object 110 may slowly pass through the rotating gantry 102 so that the detector array 108 captures incremental cross-sectional profiles of the entire object 110. Alternatively, the object 110 may remain stationary and the gantry 102 is moved along the length of the object 110 as the gantry 102 is rotated. The data generated by the detector array 108 is passed to a computer 112 that is located remotely from the gantry 102 via a connection 114. The connection 114 may be any type of wired or wireless connection. If connection 114 is a wired connection, then it include a slip ring electrical connection between the rotating part of the gantry 102 supporting the detector 108 and a stationary support part of the gantry 102 which supports the rotating part (e.g., the rotating ring). If the connection 114 comprises a wireless connection, then the detector 108 mounted on the rotating part of the gantry 102 may contain any suitable wireless transceiver to communicate data with another wireless transceiver that is not located on the rotating part of the gantry 102 and which is in communication with the computer 112. The computer 112 may include processing and imaging applications that analyze each profile obtained by the detector array 108, and the full set of profiles from each rotation is compiled to form a two-dimensional image of a cross-sectional slice of the object 110.

The design of the CT imaging system 100 as contemplated in the various embodiments is not limited to the architecture as illustrated in FIG. 1. CT imaging systems may be designed in various architectures and configurations. For example, a CT imaging system may have a helical architecture. In a helical CT imaging scanner, the X-ray source and detector array are attached to a freely rotating gantry. During a scan, a table moves the object smoothly through the scanner creating helical path traced out by the X-ray beam. Slip rings enable the transfer of power and data on and off the rotating gantry. A switched mode power supply may be used to power the X-ray source while at the same time still be small enough to be installed on the gantry.

In other embodiments, the CT imaging system may be a tomosynthesis CT imaging system. In a tomosynthesis CT scanner, the gantry may move in a limited rotation angle (e.g., between 15-60 degrees) in order to detect a cross-sectional slice of the object. The tomosynthesis CT scanner may be able to acquire slices at different depths and with different thicknesses that may be constructed via image processing.

The detector array of a CT imaging system may include an array of radiation detector elements, such as pixel sensors. The signals from the pixel sensors may be processed by a pixel detector circuit, which may sort detected photons into energy bins based on the energy of each photon or the voltage generated by the received photon. When a photon is detected, its energy is determined and the photon count for its associated energy bin is incremented. For example, if the detected energy of a photon is 24 kilo-electron-volts (keV), the photon count for the energy bin of 20-40 keV may be incremented. The number of energy bins may range from one to several, such as two to six. For example, a photon counting detector may have four energy bins: 20-40 kilo-electron-volts (keV), 40-60 keV, 60-80 keV, and above 80 keV. The larger number of energy bins, the better the material discrimination.

In order for a detector array to accurately record high photon count rates, the size of each pixel may be reduced in order to increase the spatial resolution. For example, the size of each pixel may be 0.5 mm$^2$ or smaller. However, high photon counting detectors may suffer from several detrimental effects such as the pile-up effect and charge sharing which may reduce the accuracy of the detector array.

Figure 2:
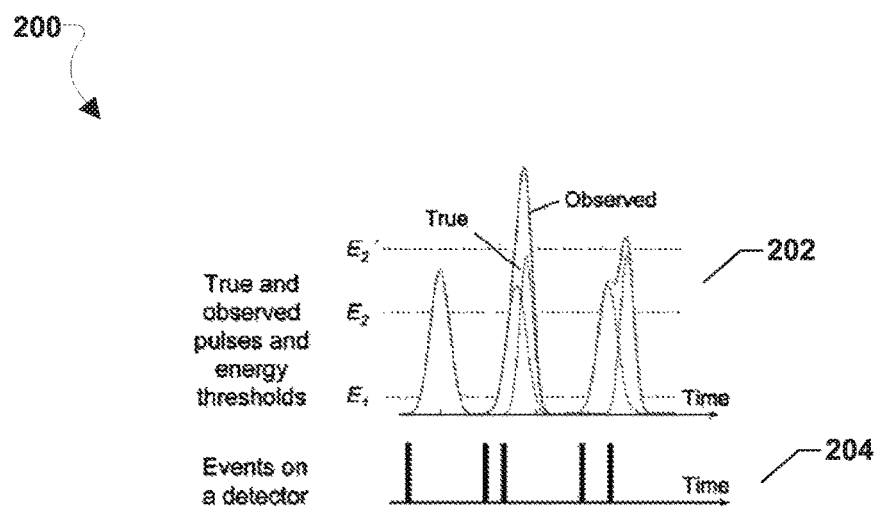
FIG. 2 is an illustration of a pile-up effect in an array of radiation detectors.

FIG. 2 illustrates an example of a pile-up effect in a radiation detector array. A diagram 200 includes a top graph 202 illustrating the true and observed energy of photons detected by a pixel sensor over time, and a bottom graph 204 illustrating discrete detection events of the pixel sensor over time. In the top graph 202, a pixel sensor may detect a first photon with an energy that exceeds the energy threshold $E_2$, which may be the threshold energy for a particular energy bin. This is recorded as a discrete detection event in the bottom graph 202. Next, two photons may strike the pixel sensor in quick succession, each having an energy between $E_2$ and $E_2'$. However, the charge of the first photon may not have dissipated before the second photon adds additional charge to the pixel sensor. Thus the pixel sensor may not be able to discriminate between the energy of both photons, resulting in the detection of a single photon with observed energy that is higher than the actual energy of both photons.

This problem is known as the pile-up effect, in which two successive pulses representing two photon-related events may overlap, creating an error in the measured energy of the photon and the photon count. Pile-up effects may be greater for larger size pixel sensors as the increased surface area may increase the probability of successive photon strikes. It is possible to reduce pulse pile-up effects by shortening the shaping time of pulse detection while processing the pixel sensor signal (i.e., reducing the width of the detected pulse in time). However, there is a limit to how short the shaping time may be when implemented in an ASIC channel that reads out the pixel sensor. In addition, the signal shape is limited by the rise time in the pixel sensors themselves and can be on the order of 5 to 50 nanoseconds (ns) depending on the detector design (e.g., carrier mobility, detector pitch, thickness, inter-pixel gap) and its use (e.g., HV bias, temperature). Typically rise time, defined in the 10-90% interval, is smaller than 15 ns.

Thus pile-up effects may result both in a loss in photon counts, referred to as dead-time losses, and a distortion of the recorded energy. The amount of the dead-time losses and the distortion of the recorded energy may depend on the incident count rate. The errors introduced by pile-up effects may result in artifacts in the re-constructed CT images. Faster detectors with smaller dead-time losses and fewer spectral distortions are being developed, but it may be difficult to achieve a linear dynamic range for both a low input count rate of heavily attenuated x-ray beams (e.g., when an object is being scanned) and a very high input count rate of un-attenuated beams (e.g., when no object is being scanned). Alternatively, hardware-based pile-up rejection circuits and/or algorithms can reduce or eliminate the spectral distortion caused by pulse pile-ups. However, the efficiency of such solutions is typically limited.

Figure 3:
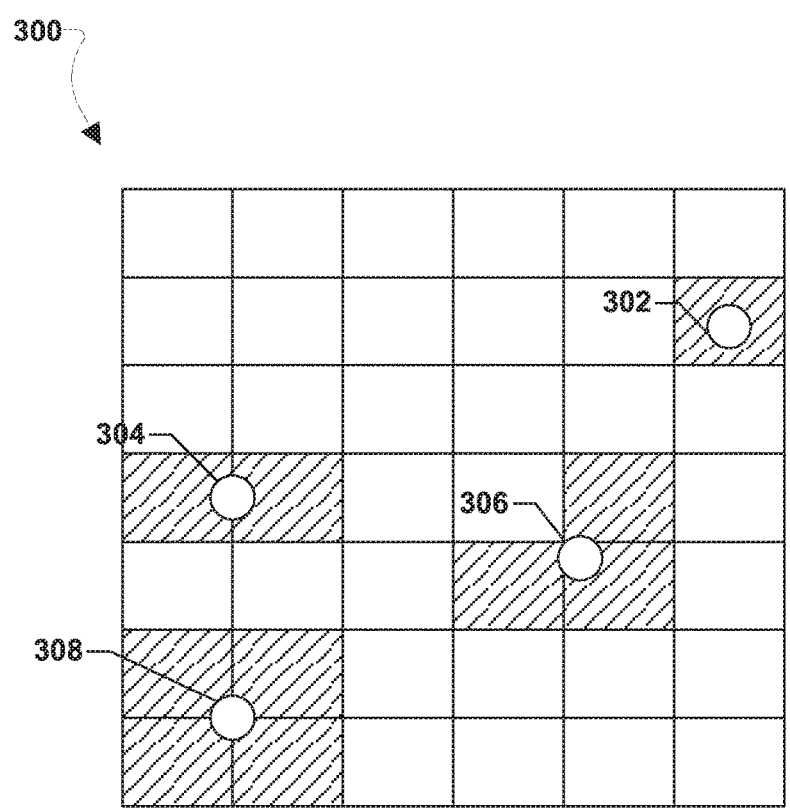
FIG. 3 is an illustration of a charge sharing effect in an array of radiation detectors.

FIG. 3 illustrates an example of a charge sharing effect in a radiation detector array. A pixel sensor array 300 may include a number of pixels arranged in a two-dimensional grid. Each pixel sensor may detect photons that strike the sensor. For example, a photon 302 may strike the middle of a pixel sensor. The pixel sensor, illustrated with cross-hatching, may detect the photon event and measure its energy. However, another photon 304 may strike at the boundary of two sub-pixels, illustrated with cross-hatching. In this case, each sub-pixel sensor may independently detect the photon event, and each may measure its energy as a portion of the total energy of the photon 304. Similarly, a photon 306 may strike at the boundary of three sub-pixel sensors, and a photon 308 may strike at a boundary of four sub-pixel sensors.

This problem is known as charge sharing, in which a single radiation event may be detected by more than one sub-pixel sensor, resulting in phantom photon counts and inaccurate energy measurements. At smaller pixel sensor sizes (e.g., <1 mm) the charge sharing between pixels becomes significant because of a higher probability that a photon strikes at the boundary of more than one pixel. At photon energy of 70 keV, a typical charge cloud diameter is about 0.05 mm (50 µm). Efforts have been made to detect charge sharing events and correct for them. For example, an arbitration circuitry may be used to identify the pixel sensor that detected the highest charge and suppress the other pixel sensors with a detected signal from recording a detection event. An analog summing circuit of the pixel sensor detecting the highest charge may then sum the detected energy with the detected energy of adjacent pixel sensors that exceeds a threshold amount. However, this approach may limit the maximum photon count rate by an order of magnitude because of the amount of time it takes to search for all pixel neighbors. This reduction in the photon count rate may not be sufficient for spectral CT applications.

Various architectures of detector arrays described herein may solve the trade-offs with respect to the pile-up and charge sharing effects when selecting the pixel sensor size of a radiation detector array. A detector array may for CT will include a number of pixels, with a size that may range from 0.5-1 mm. Each pixel may include an array of sub-pixels. When any sub-pixel of a pixel detects a photon, the detected signals of a plurality of sub-pixels in the sub-pixel array, including the sub-pixel that detected the photon, are automatically summed. Thus the small sub-pixel size may reduce the occurrence of pile-up effects, while the automatic summation may correct the charge sharing effects.

FIG. 4 illustrates a pixel 400 according to various embodiments. The pixel 400 may include a two-dimensional array of sub-pixels, each of which may be CZT sensors. The sub-pixels may be arranged in N number of rows and M number of columns, resulting in N×M number of sub-pixels in the pixel 400. For example, a pixel that is 1 mm in size may be divided into a 10×10 sub-pixel array, resulting in one hundred sub-pixels each with a size of 100 micrometers squared (µm$^2$). The sub-pixel array in the pixel 400 may reduce the required maximum count rate as compared to a monolithic pixel of the same size. For example, if the maximum count rate for the 1 mm$^2$ monolithic pixel is 100 Mcps, it would be 1 Mcps for each of the 0.01 mm$^2$ sub-pixels in a 10×10 sub-pixel array ignoring charge sharing events.

The calculation of maximum count rate reduction for the pixel 400 may be more complicated when the charge-sharing events are included. The number of charge sharing events may depend on the exact position of the incoming photons and size of the charge-cloud for each photon in relation to the size of each sub-pixel. For example, as illustrated in FIG. 4 a sub-pixel may be triggered not only when it directly receives a photon but also when a neighbor sub-pixel (e.g., a sub-pixel that is above, below, left, right of the sub-pixel) also receives at least a portion of a proton. In some cases a sub-pixel may also be triggered by a diagonal neighbor sub-pixel (e.g., diagonally upper left, diagonally upper right, diagonally lower left, diagonally lower right) in case the threshold voltage for photon detection is set low. In general, each sub-pixel may be triggered between 5 and 9 times per second.

As a comparison, assume that the pixel 400 receives 16 million detected photon events in one second. Assuming uniform spatial placement of the photons and a 4×4 array of sub-pixels, each sub-pixel in the pixel 400 receives approximately 1 million events, as well as between 4 and 8 million events coming from its neighbors. Thus the total number of events detected by each sub-pixel may be between 5-9 million, with an average of approximately 7 million events. If the pixel 400 were a monolithic sensor, it would receive approximately 16 million detection events, and likely a little more due to additional charge-sharing events that may occur with larger pixel sizes. As a result, in the 4×4 sub-pixel array the gain in reduction of the maximum count rate is at least 16/9=1.66, and on average 16/7=2.2.

As the sub-pixel array becomes larger and each sub-pixel in the array becomes smaller, the reduction in maximum count rate gets bigger. For example, in a 10×10 sub-pixel array the maximum count rate may reduced by a factor of at least ten. This reduction may be smaller for smaller sub-pixel arrays. For example, in a 3×3 sub-pixel array the reduction factor may be small, and for a 2×2 sub-pixel array the reduction factor may actually be negative, meaning that each sub-pixel may receive more events than a monolithic pixel of the same size. The maximum count rate reduction factor may be approximately (M×N)/9 for a M×N sub-pixel array. This may provide general guidance for selecting values M and N when constructing the sub-pixel array in the pixel 400.

The small size of each sub-pixel may also significantly reduce the pile-up effects. Each sub-pixel may have a separate anode that is connected to separate ASIC channels. The ASIC circuit of the pixel 400 as a whole may sum the energy signal from each sub-pixel ASIC channel when a photon count is detected to correct for charge sharing effects. Sub-pixels that may be used and methods for fabricating such sub-pixels are described in U.S. patent application Ser. No. 15/014,707, filed Feb. 3, 2016 and entitled "High Performance Radiation Detectors and Methods of Fabricating Thereof," which is hereby incorporated by reference in its entirety.

Any integer values of N and M may be selected, but an algorithm may be used to determine optimum values for N and M. The algorithm may utilize information about the characterization of the pixels (e.g., CZT sensors) and ASIC simulation or measurements to determine the values of N and M. For example, assuming a $N^2$ square array of sub-pixels, the loading capacitance at the ASIC channels connected to each sub-pixel may be decreased by a factor of $N^2$, leading to improvements in equivalent noise charge (ENC) at the input of each ASIC channel. Each sub-pixel in the array may benefit from a small pixel effect, improving the energy resolution (ER) of the readout system. Each ASIC channel connected to the sub-pixel may have reduced dark current (e.g., if the dark current was directly proportional to the area the reduction would be by a factor of $N^2$). Each charge-sharing summation worsens ER by a square root of 2 due to root mean square (RMS) noise levels being added in quadrature. In addition, further ER degradation may occur when adding noise from sub-pixels that didn't receive a photon signal. The number of charge sharing events may increase when the sub-pixel size starts becoming comparable to the charge cloud size, which may be on the order of 50-100 μm. Lastly, the maximum count rate on a per ASIC channel basis remains constant, increasing the incoming count rate per unit area of the detector surface by a factor of $N^2$.

Using the above information, an algorithm may determine a value of N that optimizes the performance for the CT imaging system. For N=1, no sub-pixel scheme is being used. For very large values of N, the sub-pixels are too small (e.g., below 50-100 μm), creating large numbers of charge-sharing events. The optimum value for N (assuming a square sub-pixel array) may then be between 1 and 1000. Thus an algorithm may utilize the maximum count rate, energy resolution of the CT imaging system, frequency of pile-up effects, or any of the other factors mentioned above in any combination to determine the most suitable sub-pixel array size for a given CT imaging system.

Figure 5A:
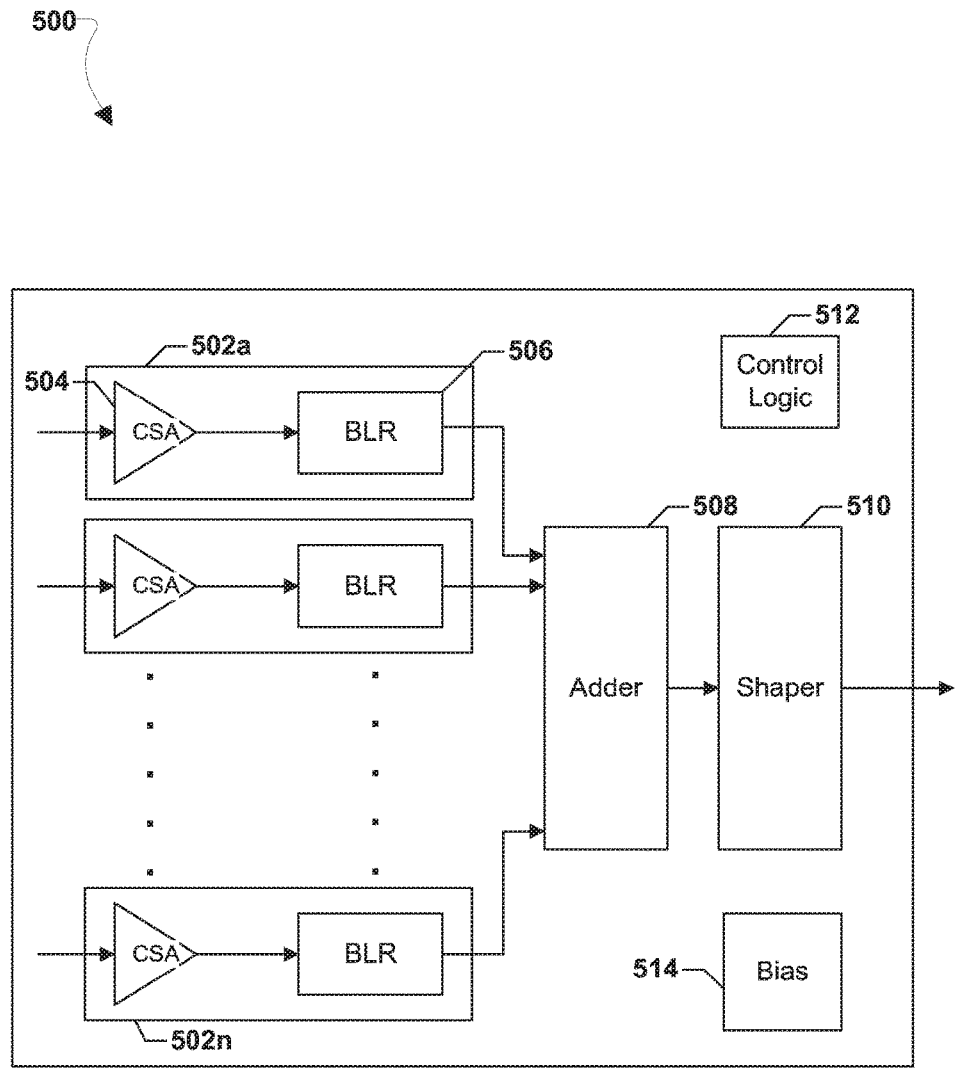
FIGS. 5A-5B are circuit block diagrams of components in a pixel detector circuit of a radiation detector array according to various embodiments.
Figure 5B:
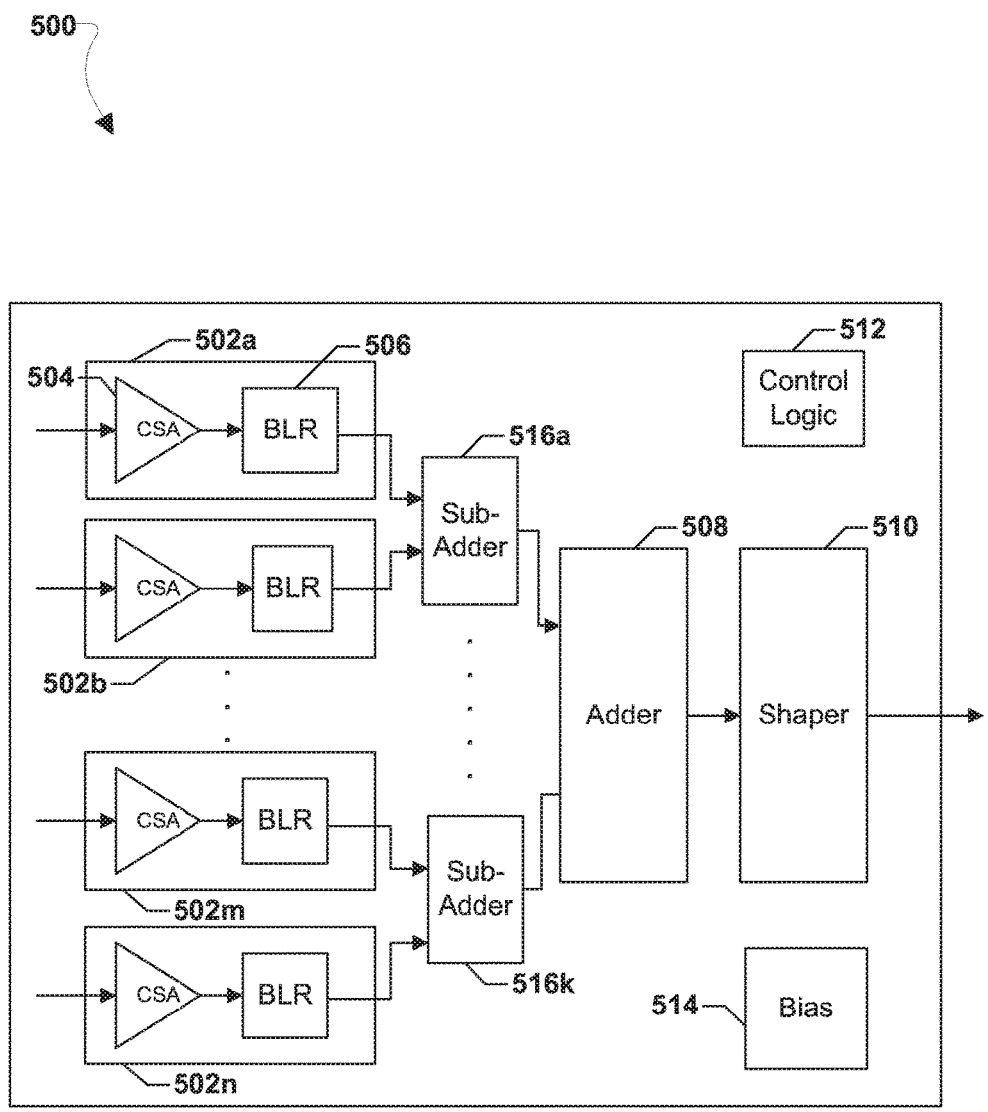

FIGS. 5A-5B are circuit block diagrams of components in a pixel detector circuit 500 of a radiation detector array according to various embodiments. The pixel detector circuit 500 may be connected to the pixel 400 in FIG. 4, so that it takes as input the signals from each sub-pixel in the pixel. For example, in FIG. 5A the pixel detector circuit 500 may include a number of ASIC channels 502*a*-502*n* that take as input the signal from each respective anode of each sub-pixel in the sub-pixel array. For example, if the pixel includes an array of N×M sub-pixels, there would be N×M ASIC channels 502*a*-502*n*. Each ASIC channel 502*a*-502*n* may include a charge-sensitive amplifier (CSA) 504 that amplifies the charge signal from an associated sub-pixel. Each ASIC channel 502*a*-502*n* may also include an optional base line restoration (BLR) circuit 506 that may be used to preserve the reference (or baseline) level for the signal.

When a photon strikes at least one sub-pixel with a charge or energy that exceeds a threshold, the pixel detector circuit 500 may trigger all the ASIC channels 502*a*-502*n* to read the charge from all the sub-pixels in the pixel. The signals from each ASIC channel 502*a*-502*n* are then added together by adder 508. The adder 508 may automatically sum the signals from each ASIC channel 502*a*-502*n* (and thus each sub-pixel) when any photon is detected. In this way, if the photon strikes more than one sub-pixel, the charges detected by each of the struck sub-pixels may be automatically added so that the actual energy of the photon may be recovered. Thus although the smaller sub-pixel array may increase the number of charge sharing events as compared to an array of relatively large pixels, the automatic summation may compensate for this increase. The automatic summation may also avoid the need to identify adjacent pixels or sub-pixels during a charge sharing event as done in the prior art as described above. As a result, there is no penalty in dead-time on a per channel basis as the signal processing for the sub-pixel array takes about the same amount of time as it would if there was no charge sharing correction.

After the adder 508 sums the signals from each sub-pixel, a shaper 510 may be used to shape the signal. Alternatively, each ASIC channel 502*a*-502*n* may include a shaper that is located after the BLR circuit 506 and filters the signal. The signal may then be outputted to other electronic components such as a field programmable gate array (FPGA) for further signal processing and read out operations. The pixel detector circuit 500 may include other components, such as a control logic circuit 512, a voltage bias 514 for providing power to the pixel detector circuit 500, a local memory storage for buffering data, an input/output interface, and other components not illustrated in FIG. 5A. The pixel detector circuit 500 may be manufactured using sub-micron complementary metal oxide semiconductor (CMOS) process nodes such as 45 nm or 65 nm. In addition, the manufacturing process may use a lower power supply voltage which may counteract increases in power dissipation due to higher ASIC channel counts. Charge will be lost in the inter-sub-pixel gap, which can be mainly accounted for by applying a scaling factor to the summed energy.

An alternate configuration of the pixel detector circuit 500 is shown in FIG. 5B, which uses multiple summing stages instead of a single adder such as the adder 508. The summing stages may be implemented in such a way that some groups of sub-pixels are summed first by sub-adders 516, which are then summed together by the adder 508. For example, in the first summing stage the ASIC channels 502*a* and 502*b* may be summed together by a sub-adder 516*a*, while the ASIC channels 502*m* and 502*n* may be summed together by a sub-adder 516*k*. The various sub-adders 516*a*-516*k* may be routed to the adder 508 in the second summing stage. The ASIC channels 502*a*-502*n* may be divided into any number of sub-groups, each sub-group being added together by sub-adder 516.

Fast control digital logic may be used to control which sub-group of sub-pixels are summed together. For example, if a photon is detected only one sub-group of sub-pixels, the charge summing may only occur within that sub-group rather than for all the sub-pixels in the sub-pixel array. This may avoid adding noise signals from the other non-affected sub-pixels in other sub-groups. For example, if a photon is detected by a sub-pixel connected to the ASIC channel 502*b*, only the signals from the ASIC channels 502*a* and 502*b* may be summed by the sub-adder 516*a* and the adder 508. The remaining ASIC channels 502 may not be summed by the remaining sub-adders 516 so that the adder 508 only receives a non-zero signal from the sub-adder 516a. There may be more than two summing stages as illustrated in FIG. 5B. The number of summing stages that may be implemented in the pixel detector circuit 500 may involve a trade-off between the complexity of the digital control scheme of the pixel detector circuit 500 and its associated power dissipation during operation, and the ability to eliminate noise from non-active sub-pixels.

Figure 6A:
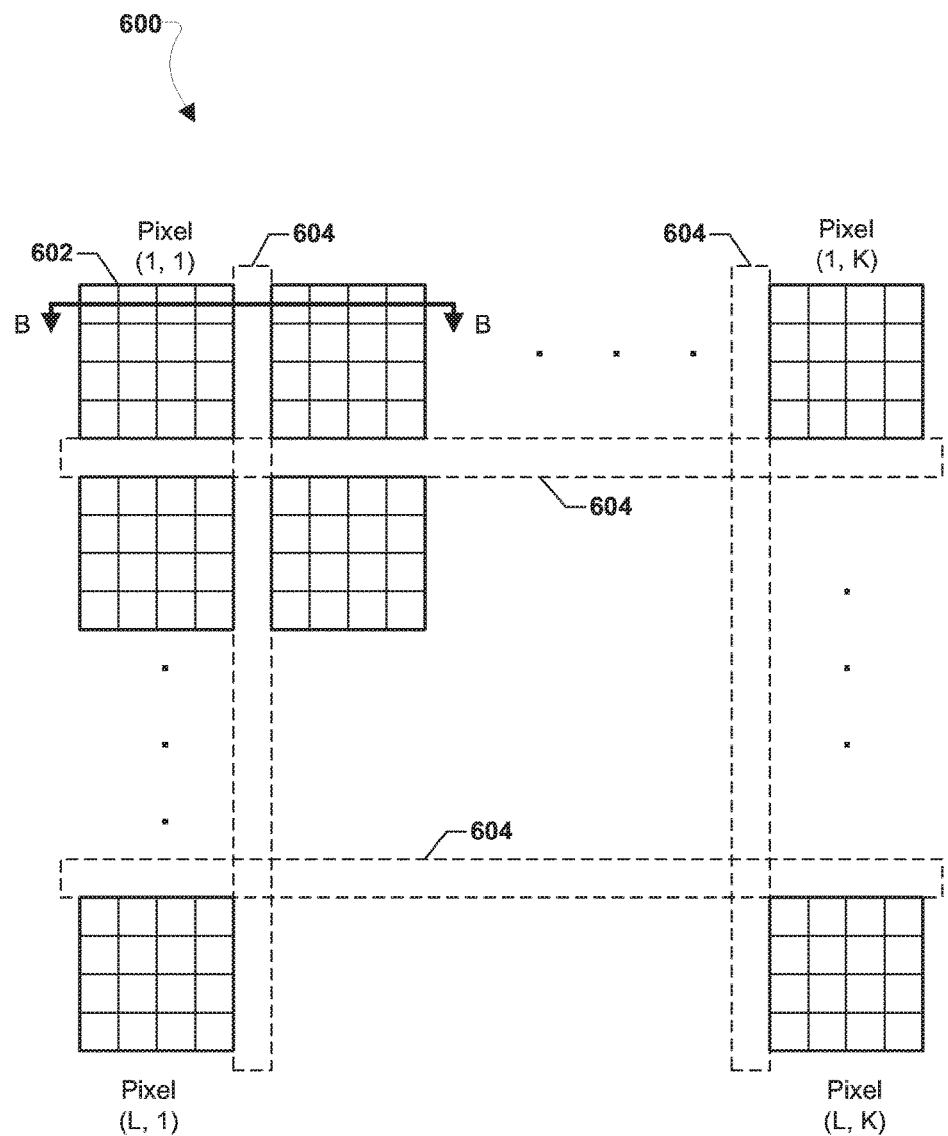
FIG. 6A is a component block diagram of a radiation detector array according to various embodiments.

FIG. 6A is a component block diagram of a radiation detector array 600 according to various embodiments. The detector array 600 may include a number of pixels 602 arranged in an array or some other configuration. For example, the pixels 602 may be arranged in a two-dimensional array with L rows and K columns, resulting in L×K number of pixels. Each pixel 602 may include an array of smaller sub-pixels, such as the pixel 400 described with reference to FIG. 4. For example, each pixel 602 may be 1 mm$^2$ in size and include a 10×10 array of sub-pixels, each sub-pixel having a size of 0.01 mm$^2$. Each pixel 602 may have an associated pixel detector circuit connected to the pixel to read out and automatically sum the signals from each sub-pixel, such as the pixel detector circuit 500 described with reference to FIGS. 5A-5B.

The sub-pixel array in each pixel 602 may compensate for charge sharing events that occur within each pixel 602. However, charge sharing events may also occur between the pixels 602, for example if a pixel strikes a boundary between two pixels. To reduce this problem, a collimator 604 may be placed between each row and column of the pixels 602. Each collimator 604 may be used to absorb photons that strike in the boundaries between the pixels 602, effectively preventing or reducing charge sharing events between the pixels 602. For example, the collimators 604 may help limit the angle of incidence of photons that strike the pixels 602. A photon that comes in at a substantially non-perpendicular angle (e.g., ±5° or more from perpendicular) to the boundary of two pixels may be blocked by the collimators 604, effectively preventing the photon from striking more than one pixel. Meanwhile, photons that come in perpendicularly to the pixel surface may either strike a single pixel or the collimators 604. Thus, a small fraction of the incident photons, for example about 1 in 10,000 photons, may actually reach the pixels 602. The collimators 604 may form a grid between the pixels 602 in the radiation detector array 600. Thus there may be a collimator 604 located between each two pixels 602 in the radiation detector array 600, but there are no collimators between any two sub-pixels within any one pixel 602.

Each collimator 604 may have a width of approximately 1-10 mm, and may have a height between 1-5 mm. No voltage may be applied to the collimators 604. The collimators 604 may be a grid-shaped wall or barrier composed of one or more of a variety of metals such as tungsten that absorb and dissipate photons. Alternatively, it may be possible to ignore charge losses from inter-pixel charge sharing events or have the pixel detector circuits calibrate out charge sharing events using reference calibration measurements using a known source signal, for example a X-ray flooded source.

Figure 6B:
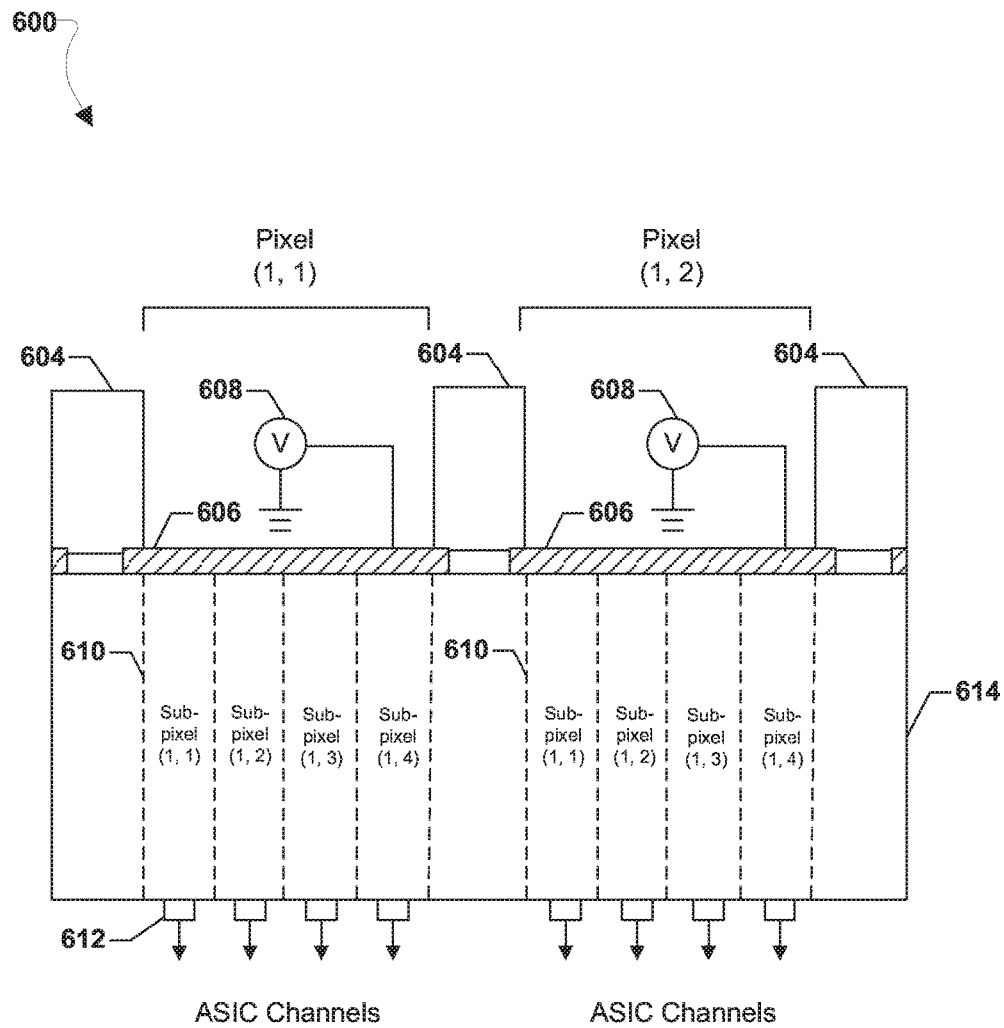
FIG. 6B is a side cross-sectional view of a radiation detector array along line B-B in FIG. 6A according to various embodiments.

FIG. 6B is a side cross-sectional view of the radiation detector array 600 along line B-B illustrated in FIG. 6A according to various embodiments. FIG. 6B illustrates a cross-sectional view of two pixels 602 in the pixel array, denoted as pixel (1, 1) and pixel (1, 2). The pixels may be formed on a common substrate 614, such as a CZT substrate.

The pixels (1, 1) and (1, 2) may be separated from each other and from other pixels in the radiation detector array 600 by the collimators 604. The collimators 604 may absorb photons that strike in the boundaries between the pixels, effectively preventing or reducing charge sharing events. The collimators 604 may form a grid structure that separates each pixel from the other pixels in the radiation detector array 600. There may be a small air gap between each collimator 604 and the common substrate 614.

Each pixel 602 may include a sub-pixel array 610, such as illustrated in FIG. 4. For example, FIG. 6B shows a cross-sectional view of sub-pixel arrays 610, each having a row of four sub-pixels (1, 1) through (1, 4). In general, the sub-pixel arrays 610 may have any number of rows and columns and is not limited to the number and arrangement shown in FIG. 6B. Each sub-pixel the sub-pixel arrays 610 may be connected to a common cathode 606 that is connected to a voltage source 608 for providing a voltage bias to the sub-pixel array 610. The common cathodes 606 for each sub-pixel array 610 may extend slightly under each collimator 604. Each sub-pixel may be connected to a separate anode 612. Each of the anodes 612 may be connected to separate ASIC channels that may read the charge from a plurality of sub-pixels in the sub-pixel array when a photon strikes one or more of the sub-pixels in the array, such as illustrated in FIGS. 5A-5B. The cross-sectional view of the radiation detector array 600 may include additional components not illustrated in FIG. 6B.

Figure 7:
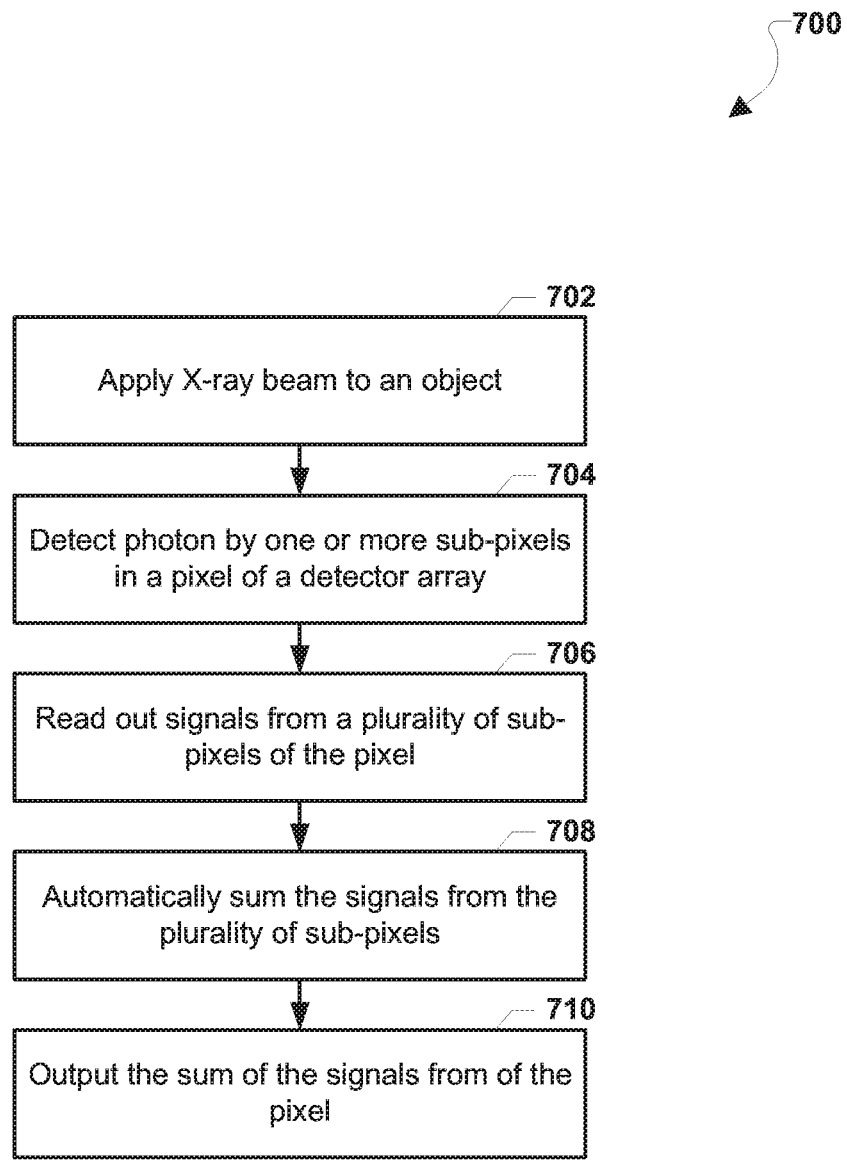
FIG. 7 is a process flow diagram of a method for operating a CT imaging system according to various embodiments.

FIG. 7 is a process flow diagram of a method 700 for operating a CT imaging system according to various embodiments. The method 700 may be performed by a CT imaging system (e.g., the CT imaging system 100) that includes an X-ray beam source and a detector array. The CT imaging system may be, for example, a helical CT scanner, a non-helical CT scanner, or a tomosynthesis CT scanner. The detector array may include a number of pixels (e.g., the detector array 600), with each pixel including an array of sub-pixels (e.g., the pixel 400). Collimators may separate rows and columns of the pixels in the detector array, as illustrated in FIG. 6. Each pixel may be connected to a pixel detector circuit that reads out and processes signals from the sub-pixels within the pixel (e.g., the pixel detector circuit 500).

In block 702, the CT imaging system may apply an X-ray beam to an object in the CT imaging system. The object may be biological (e.g., a human patient) or non-biological. The CT imaging system may include an X-ray beam source that emits an X-ray beam through the object as the gantry upon which the X-ray beam source is located is rotated relative to the object.

In block 704, a photon may be detected by one or more sub-pixels within a pixel of the detector array. For example, each pixel in the detector array may include an N×M array of sub-pixels (e.g., a pixel 602 of size 1 mm$^2$ may include a 10×10 array of sub-pixels, each sub-pixel having a size of 0.01 mm$^2$). A photon may strike one or more of the sub-pixels in the sub-pixel array.

In block 706, the signals from a plurality of sub-pixels in the pixel, including the sub-pixel that detected the photon, may be read out by a pixel detector circuit. For example, the pixel detector circuit may determine whether the charge, or energy, of the detected photon exceeds a threshold. If the photon energy does exceed the threshold, ASIC channels connected to a plurality of sub-pixels in the pixel, including the sub-pixel that detected the photon, may read out the signals from their respective sub-pixels. For example, the signals from all the sub-pixels in the sub-pixel array may be read, or the signals from a sub-group of sub-pixels in the sub-pixel array may be read out.

In block 708, the pixel detector circuit may automatically add all the signals from the plurality of sub-pixels in the pixel. For example, an adder in the pixel detector circuit may take as input the signal from each of the sub-pixel ASIC channels and sum the signals as described with reference to FIG. 5A. In some embodiments, there may be multiple summing stages, and only the sub-group of sub-pixels that includes the sub-pixel that detected the photon may be automatically summed as described with reference to FIG. 5B. The remaining sub-groups may not be summed to avoid adding noise signals to the summation. This may counteract charge sharing events in which the photon strikes more than one sub-pixel and thus the charge is spread over more than one pixel. The occurrence of charge sharing events may increase when the sub-pixel sizes are smaller. However, by automatically summing the charge detected by the plurality of sub-pixels the total energy of the photon may be captured even if the photon's charge is spread over more than one sub-pixel.

In block 710, the summed signal from the plurality of sub-pixels in the pixel may be output to other components in the CT imaging system. For example, the summed signal may be output to a FPGA or other electronic component for further signal processing before being transmitted off the gantry to a remote computer for imaging and analysis. In this manner, the method 700 provides a way to process data in a detector array architecture to compensate for charge sharing events.

While the disclosure has been described in terms of specific embodiments, it is evident in view of the foregoing description that numerous alternatives, modifications and variations will be apparent to those skilled in the art. Each of the embodiments described herein can be implemented individually or in combination with any other embodiment unless expressly stated otherwise or clearly incompatible. Accordingly, the disclosure is intended to encompass all such alternatives, modifications and variations which fall within the scope and spirit of the disclosure and the following claims.

The invention claimed is:

1. A detector array for a CT imaging system, comprising: a pixel array, wherein:
   each pair of adjacent pixels in the pixel array is separated by a collimator that absorbs photons and contacts a plurality of cathodes,
   each pixel in the pixel array comprises a sub-pixel array and one cathode,
   a cathode of a first pixel in the pixel array and a cathode of a second pixel in the pixel array are spaced apart from each other forming a gap; and
   the collimator spans the gap and contacts the cathode of the first pixel and the cathode of the second pixel.

2. The detector array of claim 1, wherein the collimator absorbs photons that strike at a boundary between adjacent pixels at a substantially non-perpendicular angle to the pixel array.

3. The detector array of claim 1, wherein each sub-pixel in the sub-pixel array has a separate anode.

4. The detector array of claim 3, wherein the anode of each sub-pixel is electrically connected to an ASIC channel, wherein all the sub-pixels in each sub-pixel array share a cathode.

5. The detector array of claim 1, wherein when a sub-pixel in a first pixel detects a photon, signals of a plurality of sub-pixels in the first pixel, including the sub-pixel that detected the photon, are automatically summed.

6. The detector array of claim 1, wherein there is no collimator or other intervening structure between adjacent sub-pixels in each pixel.

7. The detector array of claim 1, wherein each sub-pixel comprises a CZT sensor, and all the pixels in the pixel array are located on a common CZT substrate.

8. The detector array of claim 1, wherein each row and each column of pixels in the pixel array is separated by a collimator.

9. A method of fabricating a radiation detector array, comprising:
   determining a size of a sub-pixel array for each pixel of a pixel array in a radiation detector, wherein the size is based on attributes of the radiation detector, a maximum photon count rate per second, energy resolution of a CT imaging system including the radiation detector array, and a frequency of pile-up effects;
   fabricating the pixel array and the sub-pixel array of each pixel in the sub-pixel array based on the determined size, wherein each pixel is fabricated to include a cathode such that a cathode of a first pixel in the pixel array and a cathode of a second pixel in the pixel array are spaced apart from each other forming a gap;
   placing a collimator between each row and each column of the pixel array, wherein the collimator spans the gap and contacts the cathode of the first pixel in the pixel array and the cathode of the second pixel in the pixel array; and
   connecting a pixel detector circuit to each pixel in the array of pixels.

10. The method of claim 9, wherein the attributes of the radiation detector array comprises at least one of a loading capacitance of one or more ASIC channels in the pixel detector circuit, an energy resolution of the radiation detector array, a dark current of each sub-pixel, a noise level of each sub-pixel, a charge cloud size of each sub-pixel, and a maximum count rate of the one or more ASIC channels.

11. The method of claim 9, wherein each sub-pixel in the sub-pixel array comprises a CZT sensor.

12. The method of claim 9, wherein the attributes of the radiation detector array comprises each of a loading capacitance of one or more ASIC channels in the pixel detector circuit, an energy resolution of the radiation detector array, a dark current of each sub-pixel, a noise level of each sub-pixel, a charge cloud size of each sub-pixel, and a maximum count rate of the one or more ASIC channels.

* * * * *